United States Patent
Stumpe et al.

(10) Patent No.: US 10,339,193 B1
(45) Date of Patent: Jul. 2, 2019

(54) BUSINESS CHANGE DETECTION FROM STREET LEVEL IMAGERY

(71) Applicant: Google LLC, Mountain View, CA (US)

(72) Inventors: Martin Christian Stumpe, Sunnyvale, CA (US); Liron Yatziv, Sunnyvale, CA (US); Dar-Shyang Lee, Union City, CA (US); Qian Yu, Santa Clara, CA (US); Oded Fuhrmann, Cupertino, CA (US); Vinay Damodar Shet, Millbrae, CA (US); Sacha Christophe Arnoud, San Francisco, CA (US)

(73) Assignee: Google LLC, Mountain View, CA (US)

( * ) Notice: Subject to any disclaimer, the term of this patent is extended or adjusted under 35 U.S.C. 154(b) by 581 days.

(21) Appl. No.: 14/950,795

(22) Filed: Nov. 24, 2015

(51) Int. Cl.
| | | |
|---|---|---|
| *G06K 9/00* | (2006.01) | |
| *G06K 9/62* | (2006.01) | |
| *G06F 16/50* | (2019.01) | |
| *G06F 17/40* | (2006.01) | |
| *G06Q 30/02* | (2012.01) | |
| *G06F 16/587* | (2019.01) | |
| *G06F 16/9537* | (2019.01) | |

(52) U.S. Cl.
CPC ....... *G06F 16/9537* (2019.01); *G06K 9/6202* (2013.01); *G06Q 30/0201* (2013.01); *G06F 16/50* (2019.01); *G06F 16/587* (2019.01); *G06F 17/40* (2013.01); *G06K 9/00664* (2013.01)

(58) Field of Classification Search
CPC .. G06F 16/9537; G06F 16/50; G06F 16/5187; G06F 17/40; G06K 9/6202; G06K 9/00664; G06Q 9/6202
See application file for complete search history.

(56) References Cited

U.S. PATENT DOCUMENTS

| | | | |
|---|---|---|---|
| 7,359,797 B2 | 4/2008 | Dorfman et al. | |
| 7,917,286 B2 * | 3/2011 | Taylor | G06K 9/00664 382/104 |
| 8,010,407 B1 | 8/2011 | Santoro et al. | |
| 8,037,166 B2 | 10/2011 | Seefeld et al. | |

(Continued)

OTHER PUBLICATIONS

Dean, J., et al., Large scale distributed deep networks, Advances in Neural Information Processing Systems 25, pp. 1223-1231, 2012.

(Continued)

*Primary Examiner* — Matthew S Gart
*Assistant Examiner* — Stephen S Swartz
(74) *Attorney, Agent, or Firm* — Lerner, David, Littenberg, Krumholz & Mentlik, LLP

(57) ABSTRACT

Aspects of the disclosure provide for a method for updating business information. A business at a business location and a reference image for the business at the business location may be selected for an update. From a number of more recent images, a comparison image may be selected based on a likelihood that the comparison image captures the business location. Text and visual features reference image may be compared with text and visual features of the comparison image to determine a text similarity score and a features similarity score. A confidence level indicating whether the business in the reference image is in the comparison image may then be determined using the text similarity score and the feature similarity score. According to the confidence level, the business information of the business may be updated.

20 Claims, 7 Drawing Sheets

(56) References Cited

U.S. PATENT DOCUMENTS

| | | | | |
|---|---|---|---|---|
| 8,429,173 | B1* | 4/2013 | Rosenberg | G06F 17/30247 |
| | | | | 707/748 |
| 8,462,991 | B1 | 6/2013 | Clements | |
| 2006/0251292 | A1* | 11/2006 | Gokturk | G06F 17/30253 |
| | | | | 382/103 |
| 2006/0251339 | A1* | 11/2006 | Gokturk | G06K 9/00375 |
| | | | | 382/305 |
| 2006/0271287 | A1* | 11/2006 | Gold | G01C 21/26 |
| | | | | 701/426 |
| 2008/0126345 | A1* | 5/2008 | Podilchuk | G06F 17/30017 |
| 2009/0009825 | A1* | 1/2009 | Honda | H04N 1/3878 |
| | | | | 358/488 |
| 2009/0161962 | A1* | 6/2009 | Gallagher | G06F 17/30247 |
| | | | | 382/203 |
| 2010/0191797 | A1 | 7/2010 | Seefeld et al. | |
| 2011/0216201 | A1* | 9/2011 | McAndrew | G06T 7/0018 |
| | | | | 348/148 |
| 2012/0212606 | A1* | 8/2012 | Chien | H04N 1/2191 |
| | | | | 348/135 |
| 2012/0265761 | A1* | 10/2012 | Atsnnon | G06F 17/3028 |
| | | | | 707/740 |
| 2013/0191082 | A1* | 7/2013 | Barthelet | G06K 9/00637 |
| | | | | 703/1 |
| 2014/0079297 | A1* | 3/2014 | Tadayon | G06K 9/00 |
| | | | | 382/118 |
| 2014/0195921 | A1* | 7/2014 | Grosz | G06F 3/1242 |
| | | | | 715/738 |

OTHER PUBLICATIONS

Erhan, D., et al., Scalable object detection using deep neural networks, 2014 IEEE Conference on Computer Vision and Pattern Recognition (CVPR), pp. 2155-2162, 2014.

Girshick, et al., Rich feature hierarchies for accurate object detection and semantic segmentation, Proceedings of the IEEE Conference on Computer Vision and Pattern Recognition (CVPR), 2014.

Goodfellow, I.J., et al., Multi-digit number recognition from street view imagery using deep convolutional neural networks, arXiv preprint arXiv: 132.4389, 2013.

Simonyan et al., "Very Deep Convolutional Networks for Large-Scale Image Recognition", Published as a conference paper at ICLR 2015, arXiv:1409.1556v6 [cs.CV] Apr. 10, 2015, <http://arxiv.org/pdf/1409.1556.pdf>.

Seung-Seok Choi et al., "A Sruvey of Binary Similarity and Distance Measures", 2010, <http://citeseerxist.psu.edu/viewdoc/download?doi=10.1.1.352.6123&rep=rep1&type=pdf>.

* cited by examiner

100

200

300

400A

400B

400B

500B

400A

400B

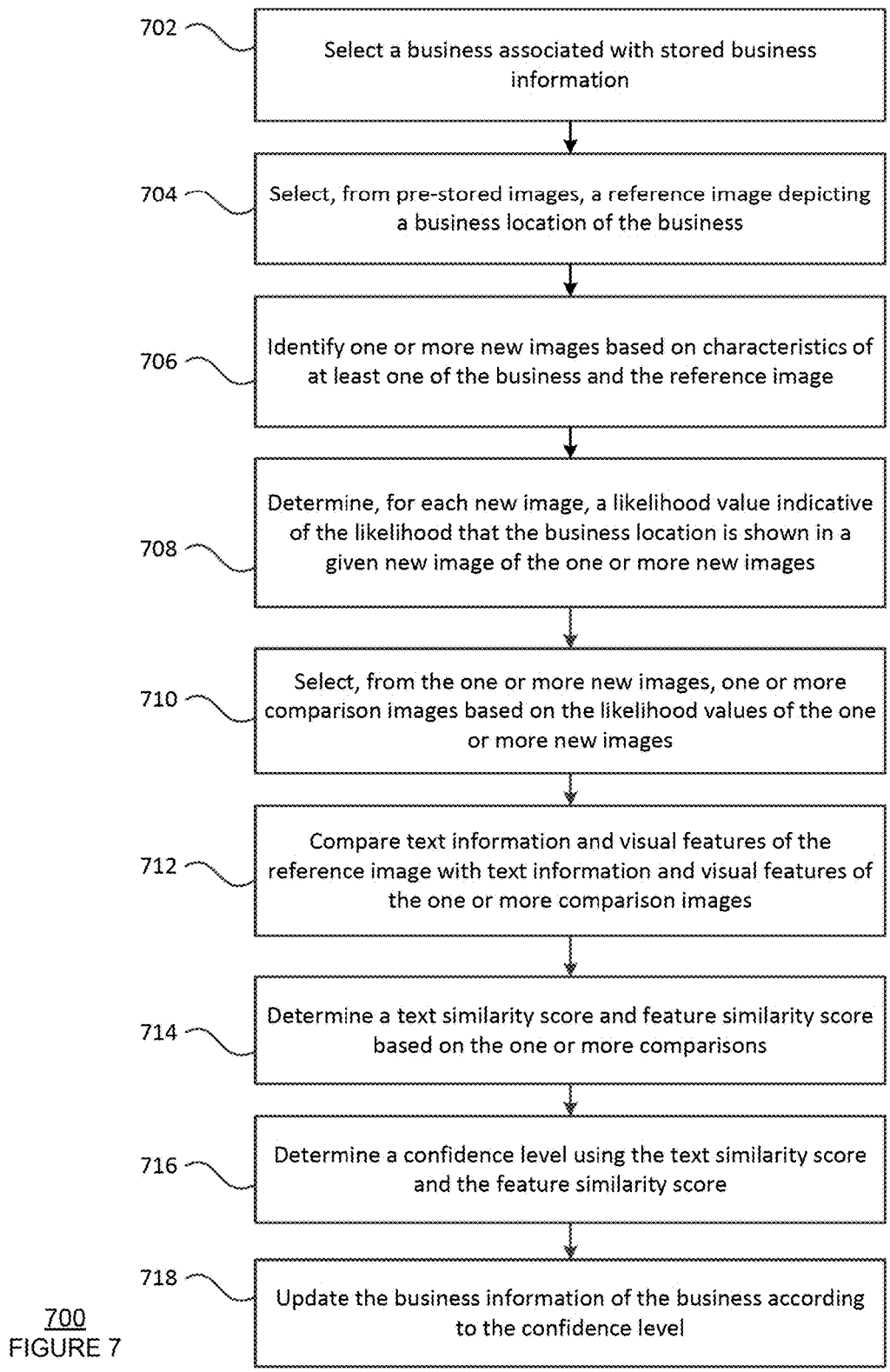

BUSINESS CHANGE DETECTION FROM STREET LEVEL IMAGERY

BACKGROUND OF THE INVENTION

Establishments, such as restaurants, gas stations, grocery stores, and other such businesses are constantly opening, closing, and moving to different locations. Directories which track establishment locations are therefore in constant need of updating to maintain accurate establishment locations. In some examples, a human operator may need to flag an incorrect establishment that is linked to a location and/or manually update or correct the directory. The need for manual input may result in delays or even a failure to update a directory resulting in inaccurate establishment locations.

BRIEF SUMMARY OF THE INVENTION

Aspects of the disclosure provide for a method for updating business information. The method includes selecting, using one or more processors, a business associated with stored business information; selecting, from pre-stored images, using the one or more processors, a reference image depicting a business location of the business, the reference image having a timestamp; identifying, using the one or more processors, one or more new images based on characteristics of at least one of the business and the reference image, each of the one or more new images being associated with a timestamp that is more recent than the timestamp of the reference image and location and orientation information; for each new image, determining, using the one or more processors, a likelihood value indicative of the likelihood that the business location is shown in a given new image of the one or more new images, the likelihood value being based on a physical relationship between the given new image's location and orientation and one or more rays projected from the business location and the location of the given new image; selecting from the one or more new images, using the one or more processors, a comparison image based on the likelihood values of the one or more new images; comparing, using the one or more processors, text information and visual features of the reference image with text information and visual features of the comparison image; determining, using the one or more processors, a text similarity score and a feature similarity score based on the comparison; determining, using the one or more processors, a confidence level using the text similarity score and the feature similarity score, the confidence level indicating whether the business in the reference image is in the comparison image; and updating, using the one or more processors, the business information of the business according to the confidence level.

In one example, the method also includes receiving, using the one or more processors, a request for business information of the business; and providing, using the one or more processors, the updated business information in response to the request. In another example, the likelihood value for a particular image is highest when the particular image is oriented along one of the rays and in the direction of the business location. In yet another example, selecting the comparison image also includes determining whether the likelihood value of each new image of the one or more new images satisfies a likelihood value threshold; and selecting a new image that both satisfies the likelihood value threshold and has a most recent timestamp of any other new images of the one or more new images that also satisfy the likelihood value as the comparison image.

In a further example, the method also includes identifying, by the one or more processors, using a deep neural network, an image region in the reference image and an image region in the comparison image, and wherein comparing the text information and visual features of the reference image with text information and visual features of the comparison image comprises comparing text information and visual features from within the image regions. In another example, comparing the text information of the reference image with text information of the comparison image also includes detecting words in the reference image and the comparison image; and determining a percentage of the words detected in the comparison image that match the words detected in the reference image, wherein the text similarity score is determined further based on the percentage. In this example, the method also includes determining a number of uncommon words detected in the comparison image that match the words detected in the reference image, and wherein the text similarity score is based on at least the determined number of uncommon words.

In another example, the feature similarity score is determined based on at least a percentage of visual features in the comparison image that match visual features in the reference image. In yet another example, updating the business information includes, when the confidence level is above a confidence level threshold, storing the comparison image in association with the business. In this example, the confidence level threshold is a first confidence level threshold and updating the business information includes, when the confidence level is below the first confidence level threshold and above a second confidence level threshold, flagging the comparison image for review.

In a further example, updating the business information includes, when the confidence level is below a confidence level threshold, indicating the business is closed or replaced by another business. In another example, selecting the reference image also includes checking for objects in one or more of the pre-stored images that are at least partially occluding the business location. In yet another example, the method also includes selecting, by the one or more processors, a plurality of businesses along a route; and receiving, by the one or more processors, a series of new images from a device configured to collect images sequentially along the route; wherein each business in the plurality of businesses is selected and updated sequentially along the route.

Other aspects of the disclosure provide for a system for updating business information. The system includes a memory storing business information and one or more images in association with one or more businesses and one or more processors. The one or more processors are configured to select a business associated with stored business information; select a reference image depicting a business location of the business, the reference image having a timestamp; identify one or more new images based on characteristics of at least one of the business and the reference image, each of the one or more new images being associated with a timestamp that is more recent than the timestamp of the reference image and location and orientation information; for each new image, determine a likelihood value indicative of the likelihood that the business location is shown in a given new image of the one or more new images, the likelihood value being based on a physical relationship between the given new image's location and orientation and one or more rays projected from the business location and the location of the given new image; select from the one or more new images a comparison image based on the likelihood values of the one or more new images;

compare text information and visual features of the reference image with text information and visual features of the comparison image; determine a text similarity score and a feature similarity score based on the comparison; determine a confidence level using the text similarity score and the feature similarity score, the confidence level indicating whether the business in the reference image is in the comparison image; and update the business information of the business according to the confidence level.

In one example, the one or more processors are also configured to receive a request for business information of the business; and provide the updated business information in response to the request. In another example, a likelihood value for a particular image is highest when the particular image is oriented along one of the rays and in the direction of the business location. In yet another example, the one or more processors are also configured to select the comparison image by determining whether the likelihood value of each new image of the one or more new images satisfies a likelihood value threshold; and selecting a new image that both satisfies the likelihood value threshold and has a most recent timestamp of any other new images of the one or more new images that also satisfy the likelihood value as the comparison image.

In a further example, the one or more processors are also configured to identify, using a deep neural network, an image region in the reference image and an image region in the comparison image, and wherein the text information and visual features of the reference image are compared with text information and visual features of the comparison image by comparing text information and visual features from within the image regions. In another example, the one or more processors are also configured to compare the text information of the reference image with text information of the comparison image by detecting words in the reference image and the comparison image; determining a percentage of the words detected in the comparison image that match the words detected in the reference image, wherein the text similarity score is determined further based on the percentage; and determining a number of uncommon words detected in the comparison image that match the words detected in the reference image. In yet another example, the one or more processors are also configured to select the reference image by checking for objects in one or more of the pre-stored images that are at least partially occluding the business location.

Further aspects of the disclosure provide for a non-transitory, tangible machine readable medium on which instructions are stored. The instructions, when executed by one or more processors, cause the one or more processors to perform a method. The method includes selecting a business associated with stored business information; selecting a reference image depicting a business location of the business, the reference image having a timestamp; identifying one or more new images based on characteristics of at least one of the business and the reference image, each of the one or more new images being associated with a timestamp that is more recent than the timestamp of the reference image and location and orientation information; for each new image, determining a likelihood value indicative of the likelihood that the business location is shown in a given new image of the one or more new images, the likelihood value being based on a physical relationship between the given new image's location and orientation and one or more rays projected from the business location and the location of the given new image; selecting from the one or more new images a comparison image based on the likelihood values of the one or more new images; comparing text information and visual features of the reference image with text information and visual features of the comparison image; determining a text similarity score and a feature similarity score based on the comparison; determining a confidence level using the text similarity score and the feature similarity score, the confidence level indicating whether the business in the reference image is in the comparison image; and updating the business information of the business according to the confidence level.

BRIEF DESCRIPTION OF THE DRAWINGS

FIG. 7 is an example flow diagram in accordance with aspects of the disclosure.

DETAILED DESCRIPTION

Overview

Figure 1:
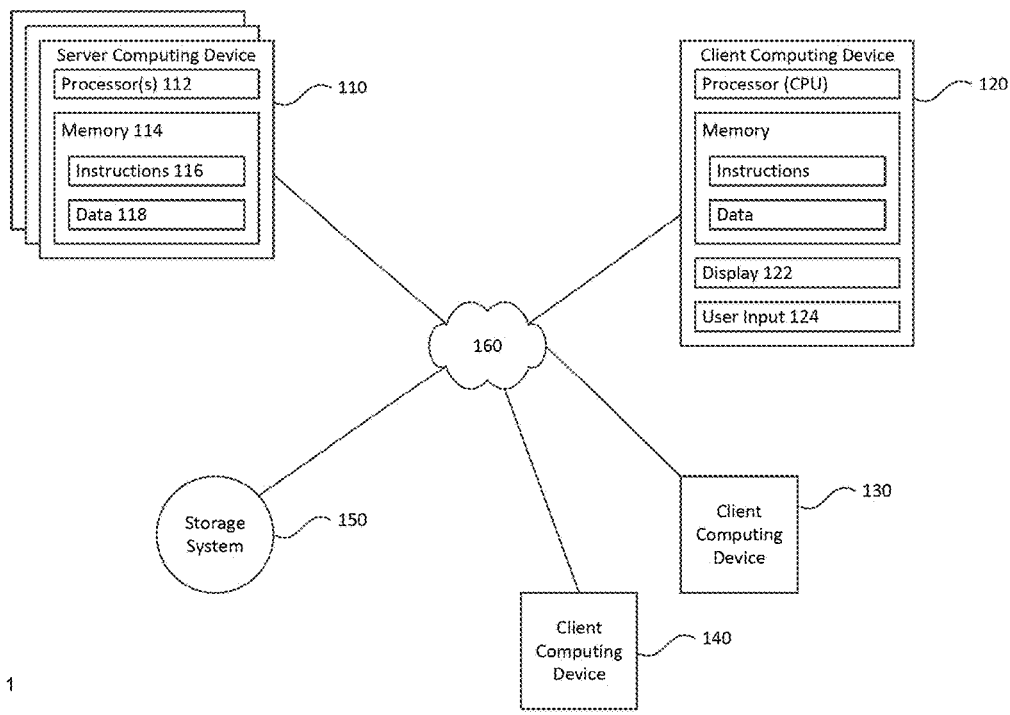
FIG. 1 is a functional diagram of an example system in accordance with aspects of the disclosure.

The technology relates to automatically or semi-automatically updating business information, solely based on images of a business location taken at different times. As an example, the business information may be updated based on whether a business is still open or has been replaced by another business at the business location. For instance, a first image taken at a first point in time may depict a location of a first business, such as a storefront of the first business. The first image may be compared with a second image depicting the location of the first business taken at a later point in time. Based the amount and degree of detected differences between the first image and the second image, it may be determined whether or not the business depicted in the second image is still the first business. If not, business information and map information for the first business may be updated to show that the first business is closed at the location and, in some instances, that a second business is now open at the location.

In order to update business and map information as discussed above, one or more businesses having stored business information and one or more corresponding reference images may be selected for an update. Businesses may be selected based on factors such as location, type, latest update, and identifying or receiving new images of a business location associated with a business. A reference image depicting a business location of a selected business may be selected from the pre-stored images. The reference image may be selected using, at least in part, the timestamp information associated with the one or more images.

One or more new images may be identified based on characteristics of the business and/or the reference image. New images may be user generated or updated street level images of buildings, etc. captured for image based map services and may be stored in a storage system or database. Each new image may have a timestamp that is more recent in time than the timestamp of the reference image. In addition, each new image may be associated with location and orientation information of the camera that captured the new image. In some examples, other information such as three-dimensional geometry information may also be associated in the reference image.

Using the location and orientation of each new image, a likelihood value indicative of the likelihood that the business location is shown in the identified one or more images may be determined. Based on the likelihood values of the one or more images, a comparison image may be selected from the identified one or more new images to compare with the reference image. The selection of the comparison image may also be based on timestamps of each new image.

The reference image may be compared with the comparison image to determine how similar both images are to each other. Specifically, the image region in the reference image depicting the business location and the image region in the comparison image depicting the business location may be compared. Image regions may be identified by locating the business location in the image using three-dimensional (3D) geometry information, computer vision approaches, or human operators.

As part of the comparison, the image regions may be processed to detect text information. In comparing the two images, the characteristics of detected text may be considered. A text similarity score may be determined based on the percentage of words that are matching between the reference image and the comparison image, the similarity of the characteristics of the words in both images, and/or the number of matching words or phrases that are uncommon.

As another part of the comparison, visual features in the reference and comparison images may be detected and used to determine a feature similarity score. Computer vision approaches may be used to detect the visual features and determine a feature similarity score based on the percentage of matching visual features between the reference image and the comparison image.

Using the text similarity score and the feature similarity score, a confidence level for whether the selected business in the reference image is the same as any business in the comparison image may be determined. The confidence level may be highest when both the text similarity score and the image similarity score are relatively high, meaning the selected business shown in the reference image and a business shown in the comparison image is the same. On the other hand, the confidence level may be lowest when both the text similarity score and the image similarity score are relatively low, meaning the business shown in the reference image is not shown in the comparison image.

According to the confidence level, business information of the business may be updated. The higher the confidence level, the more likely the selected business still exists at the business location. Thus, if the confidence level is above a confidence level threshold, the business information for the business may be updated to include a confirmation that the business is still open at the time indicated on the timestamp of the comparison image. The lower the confidence level, the more likely the selected business is closed at the business location. The business information for the business may then be updated to indicate the selected business is closed or replaced by a new business. Business information for the new business may be extracted and stored in association with the business location.

Example Systems

Figure 2:
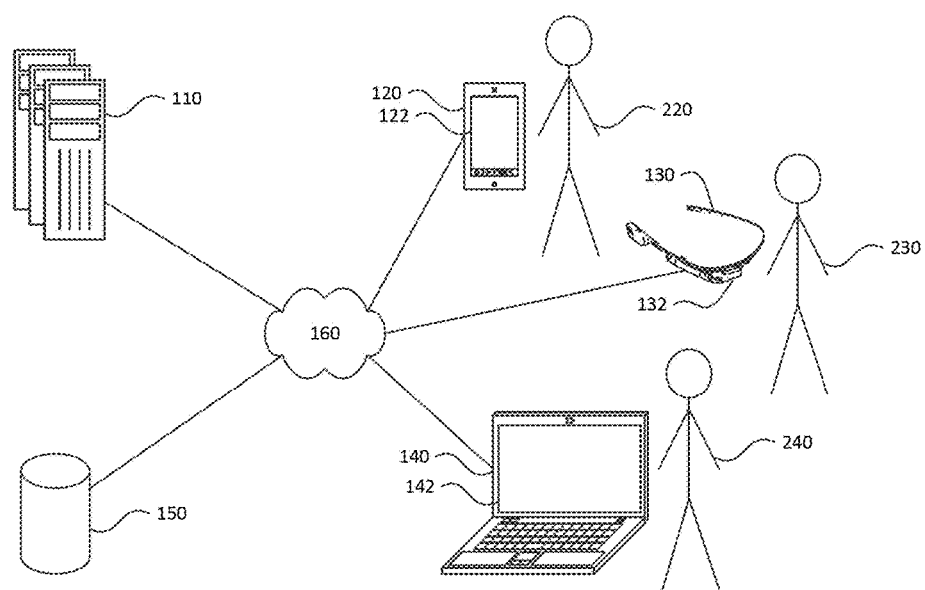
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, as well as storage system 150. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112. Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device (as well as collection device) being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. For example, storage system 150 may store business information for one or more businesses. As an example, businesses may be stored in association with listing data as business information. This listing data may include a name of the business, business location, images of the business, hours of operation, contact information, website, and other such information. A business location may be an actual geographic location such as an address, latitude and longitude coordinates, etc. The geographic location of a business location may correspond to an area occupied by the business storefront of the business. As an example, a business location of a business may be determined by triangulation using at least two images of the business and the location and orientation of the respective cameras and/or any respective associated 3D geometry information.

Storage system 150 may also store images or videos, image location data, image pose information, 3D geometry data, and algorithms for analyzing and manipulating images or videos. Images or videos may be part of image files that are associated with a business, a business location, and/or other information, such as an image identifier that can be used to retrieve the image, a timestamp indicating a date and a time the image was created, and image format (JPEG, TIFF, etc.). The image files may also contain pose information including geographic location information and orientation information at which the image was captured. As an example, location information may include latitude/longitude coordinates or may be other location coordinates. The pose of an image may be determined or known such that the image may be realistically posed (or oriented) relative to the earth. Connections identifying the physical relationships, such as distances and orientations, between images may be stored on storage system 150 as well.

Figure 3:
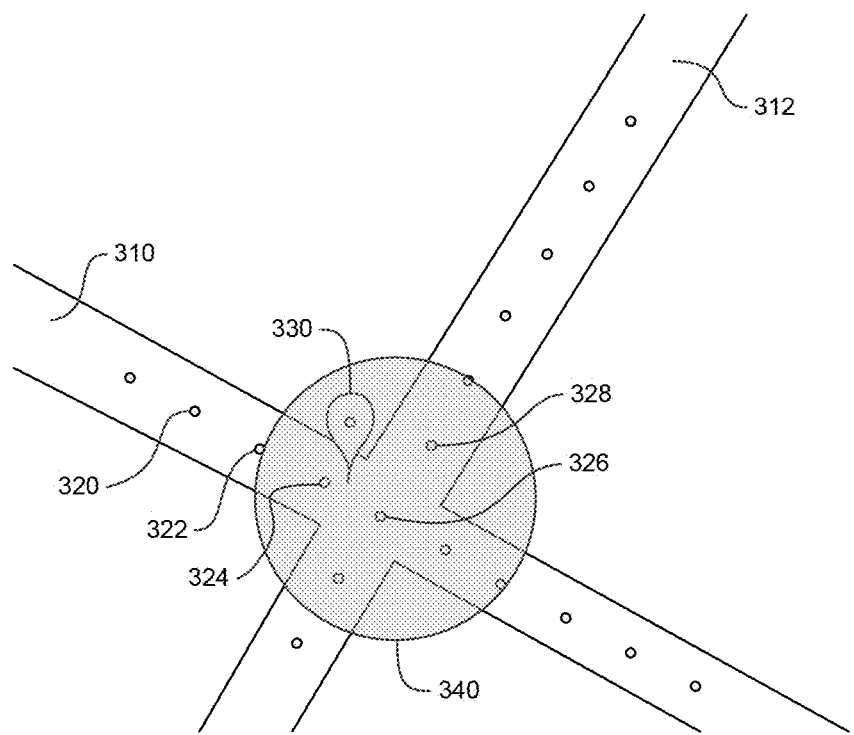
FIG. 3 is a diagram of example data in accordance with aspects of the disclosure.

Shown in FIG. 3 is a pictorial diagram of an overhead view of a geographic area 300 including a business location of a business. The geographic area 300 includes portions of streets 310, 312. Markers in FIG. 3 represent image capture locations 320, 322, 324, 326, 328; a business location 330; and an area 340 surrounding the business location 330.

The 3D geometry data may be generated from multiple images and/or captured using technology such as LIDAR. 3D geometry data may include 3D meshes and/or points which identify physical features at locations depicted in at least some of the images. The images may be organized and stored as collections based on being of one or more businesses or one or more business locations in a given area or on a given street.

At least some of the stored images may including panoramic images have a field of view greater than 180 degrees. Some of the stored images may include spherical panoramic images having a field of view of 360 degrees. For spherical panoramic images, pose information may indicate which parts of the panoramic image points up, down, North, South, East, and/or West.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Example Methods

In addition to the operations described above and illustrated in the figures, various operations will now be described. The following operations do not have to be performed in the precise order described below. Rather, various steps can be handled in a different order or simultaneously, and steps may also be added or omitted.

One or more businesses having stored business information may be selected for an update. As an example, a business may be selected based on factors such as location, type, latest update, and identifying or receiving new images of the business location associated with the selected business. In one example, shown in FIG. 3, a business, "RESTAURANT UNO," at business location 330 may be selected as part of an exhaustive sweep update of businesses along street 310, street 312, or geographic area 300. In some examples, the geographic area of the exhaustive sweep may be one or more blocks or of a whole town. In an exhaustive sweep, businesses having business locations on a given street or given area are all selected for update. Exhaustive sweeps may be automatically performed at given intervals; for example, weekly, monthly, or annually. In other examples, the selected businesses may all be the same type of business, such as a restaurant. In yet other examples, the selected businesses may have business information that has not been updated for a period of time; for example, one month. Businesses may be selected automatically or by a human operator.

In order to update the business information of the selected business, a reference image depicting a business location of a selected business may be selected from the pre-stored images. One or more images and/or regions of images of a storefront of the selected business may be associated with geographic locations that are within a predetermined distance of the business location. As shown in FIG. 3, the area 340 covers geographic locations within a predetermined distance of business location 330. Therefore, a reference image may be selected from the one or more images depicting the location of the storefront at business location 330. The reference image may be selected using, at least in part, the timestamp information associated with the one or more images. For example, one of the most, if not the most, recent of the one or more images may be selected.

Figure 4A:
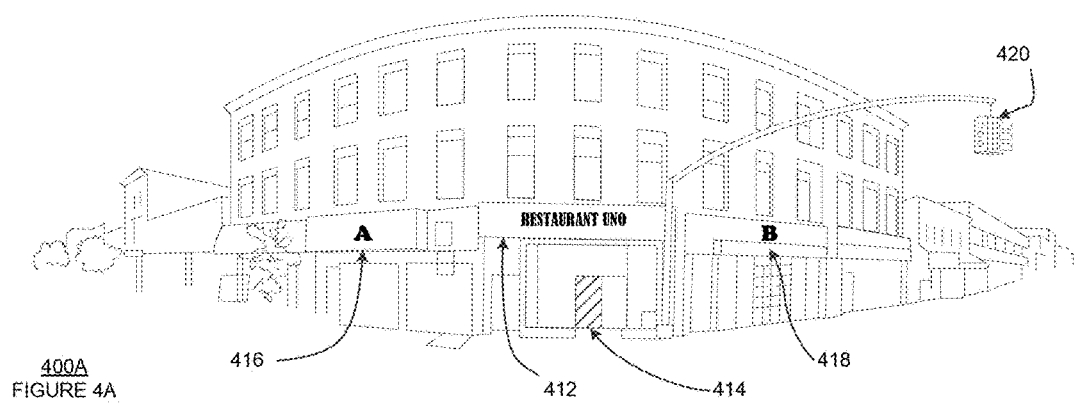
FIGS. 4A and 4B are example images in accordance with aspects of the disclosure.

For example, image 400A, shown in FIG. 4A, may be selected as the reference image for business location 330. Reference image 400A for business location 330 of a business depicts storefront sign 412 with the name "RESTAURANT UNO" in all uppercase serif letters and a door 414 with diagonal stripes. The image context of business location 330 depicted in reference image 400A includes neighboring business A that has storefront sign 416 to the left of RESTAURANT UNO, neighboring business B that has storefront sign 418 to the right of RESTAURANT UNO, and a traffic light 420 hanging to the right of RESTAURANT UNO.

One or more new images may be identified as candidate comparison images based on characteristics of the business and/or the reference image. New images may be provided by users or collected from image capture devices such as a panoramic camera mounted on a vehicle and may be stored in the storage system 150. Each new image may have a timestamp that is more recent in time than the timestamp of the reference image. In addition, each new image may be associated with location and orientation information of the camera that captured the new image. Other information such as three-dimensional geometry information may be associated in the reference image.

Figure 4B:
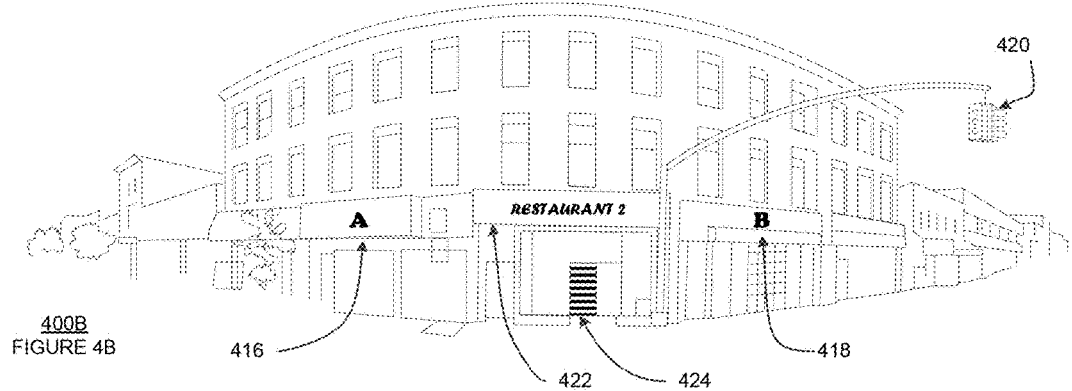

The new images may be identified as being of the business location using the characteristic of image capture location. The identified new images may be taken from locations within a predetermined distance of the business location associated with the selected business may be identified. As shown in FIG. 3, newly added images taken from image locations in area 340, such as image capture locations 324, 326, and 328, are identified. It follows that images taken from locations that fall outside area 340, such as image capture locations 320 and 322, are not identified. One example of a new image is 400B, shown in FIG. 4B. New image 400B depicts a business location having storefront sign 422 with the name "RESTAURANT 2" in all uppercase sans serif letters and a door 424 with horizontal stripes.

In addition, the new images may be identified as being of the business location based on visual features. Visual features may include colors, shapes, and locations of other businesses, building structures, or other persistent features. For example, storefront signs, windows, doors, trees, and traffic lights may be identified and matched. The identified new images may have a number of visual features that match visual features of the reference image. The number of matching visual features may be determined using a computer vision approach such as a deep neural network. The visual features surrounding an image region depicting the business in the reference image, or image context, may first be identified and then may be matched with visual features in the new images. In this way, visual features may be used to define the image context and the image regions associated with the business location in the reference image and comparison image.

If an image has the same or similar image context as the reference image, the image is probably depicting the same location as the reference image. For example, if the business is depicted in the reference image as surrounded by two other businesses and a traffic light, then an image region in the comparison image may be identified by identifying where the two businesses and the traffic light are in the comparison image. Referring to the examples of FIGS. 4A and 4B, the image context of the business location in new image 400B also includes neighboring business A that has storefront sign 416 to the left of a business location, neighboring business B that has storefront sign 418 to the right of the business location, and a traffic light 420 hanging to the right of the business location. Because the image context of business location 330 in reference image 400A matches the image context of the business location in new image 400B, new image 400B is identified as being of the same location as business location 330.

Using the location and orientation of each new image, a likelihood value indicative of the likelihood that the business location is shown in the identified one or more images may be determined. The likelihood value may be determined based on a physical relationship between the business location and the location and orientation associated with a given new image. These likelihood values may be determined by projecting one or more rays from image capture location of the new image towards the image location and comparing these one or more rays to the orientation of the new image. In some examples, only one ray is projected from the center of the business location to the image capture location of a new image while in other examples, multiple rays are projected towards edges and/or facade of a business location.

Figure 5A:
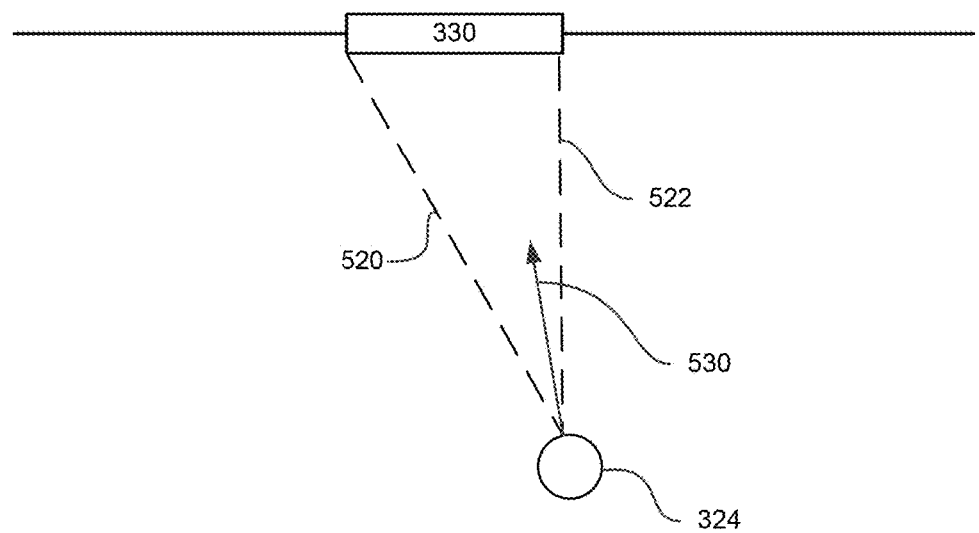
FIGS. 5A and 5B are examples of ray projections in accordance with aspects of the disclosure.
Figure 5B:
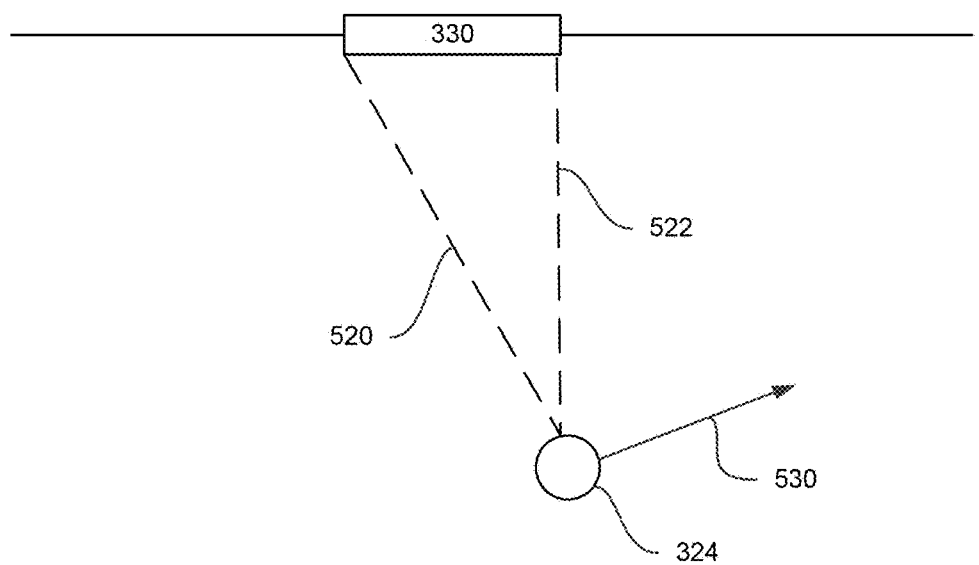

For example, as shown in FIGS. 5A and 5B, one or more rays 520, 522 are projected from business location 330 to an image capture location 324 of new image 400B and new image 500B. Ray 520 may be projected from a first edge of business location 330 to image capture location 324. Ray 522 may be projected from a second edge of business location 330 to image capture location 324. Other rays may be projected from anywhere else along the edges of business location 330 or within the edges of business location 330.

Arrow 530 points in the direction of the orientation at which new image 400B and new image 500B were captured from image capture location 324. In FIG. 5A, arrow 530 indicates the orientation of new image 400B is between rays 520 and 522, more or less pointing along rays 520, 522, and any rays in between towards business location 330. In FIG. 5B, arrow 530 indicates the orientation of new image 500B and is angled away from rays 520 and 522, pointing at an angle away from business location 330. The angle between arrow 530 in FIG. 5B and ray 520 is about 100 degrees, and the angle between arrow 530 and ray 522 is about 70 degrees.

If the given new image is captured by a camera oriented along one of the rays in the direction of the business location then the likelihood value that the business location is shown in the new image may be relatively higher, such as 99%. If the camera is angled slightly away from the nearest ray, for example, between 0 and 45 degrees, the likelihood value may be relatively lower such as 90% at 10 degrees, 50% at 35 degrees and so on. Because arrow 530 in FIG. 5A is about 10 degrees from ray 522, the likelihood value for new image 400B is 90%. If the camera is pointed away from the business location, for example, greater than 45 degrees from the nearest ray, the likelihood value may be even lower or 0%. Because arrow 530 in FIG. 5B is about 75 degrees from ray 522, the likelihood value for new image 500B is 20%.

A comparison image may be selected from the identified one or more new images to compare with the reference image based on the likelihood values of the one or more new images. For example, the comparison image may be required to satisfy a likelihood value threshold, such as 90%. Using the likelihood value threshold of 90%, new image 400B meets the threshold and therefore is selected as a comparison image. Meanwhile new image 500B falls short of the threshold and is not selected as a comparison image. The selection of the comparison image may also be based on timestamps of each new image. For example, if more than one new image meets the likelihood threshold value, then the new image may be selected as the comparison image using, at least in part, the timestamp of the image. For example, the new image may have one of the most, if not the most, recent timestamp.

The reference image may be compared with the comparison image to determine how similar both images are to each other=. Referring to the examples of FIGS. 6A and 6B, the image region 610 in the reference image 400A depicting the business location 330 and the image region 620 in the comparison image 400B depicting the business location may be compared. Image regions may be identified by locating the business location in the image using 3D geometry information. Image regions may also be identified by a bounding box generated via a computer vision approach, such as a deep neural network, or by human operators. In some examples, an image region of the reference image depicting the business may be identified first and may be used to identify the image region in the comparison image as described above in relation to FIGS. 4A and 4B.

As part of the comparison, the image regions may be processed to detect text information. For example, optical character recognition may be used to detect text information. In comparing the two images, the characteristics of detected text may be considered. A text similarity score may be determined based on the percentage of matching words between the reference image and the comparison image and the similarity of the characteristics, such as size, lettering, context, and semantics, of the words in both images.

Figure 6A:
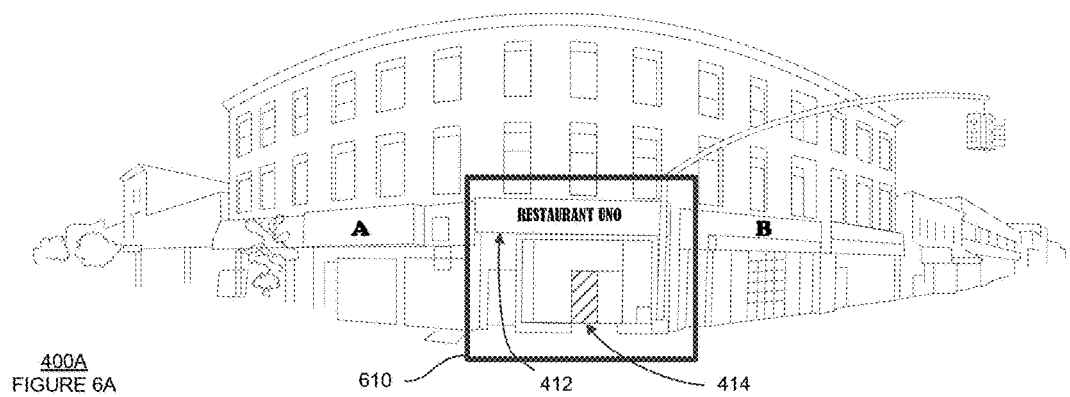
FIGS. 6A and 6B are example images in accordance with aspects of the disclosure.
Figure 6B:
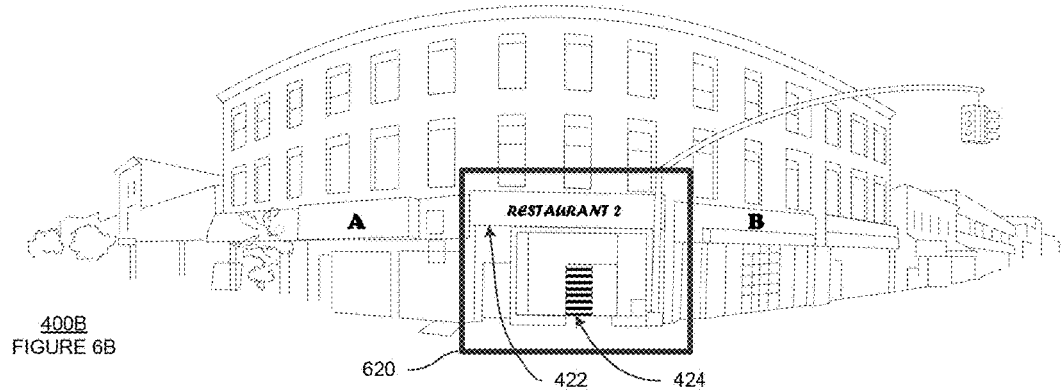

In the example shown in FIGS. 6A and 6B, image region 610 in reference image 400A is compared with image region 620 in comparison image 400B. The words "RESTAURANT" and "UNO" are identified in image region 610. Detected characteristics of the words "RESTAURANT" and "UNO" include that they are written in all uppercase, are written in all of the same serif font, and are positioned on a storefront sign 412 above the storefront. Using the detected characteristics, "RESTAURANT UNO" is identified as the business name in image region 610. In image region 620, the words "RESTAURANT" and "2" are identified. Detected characteristics of the words "RESTAURANT" and "2" include that they are written in all uppercase, are written in all of the same sans serif font, and are positioned on a storefront sign 422 above the storefront. Using the detected characteristics, "RESTAURANT 2" is identified as the business name in image region 620. The word "RESTAURANT" is a match between image region 610 and 620. The text similarity score therefore may be 50% based on the fact that the textual content is a 50% word match where each image region includes two words and have one word in common, the case of both business names are uppercase, and the font of the business names differs to degree.

In addition, certain detected words may be given greater weight than others in the text similarity score. For instance, a detected business name may carry more weight than words that are common to many business, such as "the," "avenue," "pizza," etc. In other words, if the name of the business and/or a number of uncommon words in the reference image is detected in the comparison image, then the text similarity score will be high. Uncommon words include words or combination of words that are specific to a business; for example, slogans and jingles. If the majority of the matching words are common words, the text similarity score will be lower. Returning to the example in FIGS. 6A and 6B, the word "RESTAURANT" that is a matching word between image region 610 and 620 is a common word because it is found in the name of many businesses. In contrast, the word "UNO" in image region 610 and the word "2" in image region 620 are uncommon words because they are not found in the name of many businesses. Therefore, the fact that the words "UNO" and "2" do not have matches is weighted more than the match of the word "RESTAURANT" in determining the text similarity score. In this regard, the text similarity score may be less than 50%, for example, 20%.

In addition, visual features in the reference and comparison images may be detected as part of the comparison. For example, defining features of a business storefront such as storefront signs, doors, windows, and tables may be detected in each image and compared. A deep neural network or other computer vision approaches may be used to detect the visual features. Specifically for neural networks, visual features are implicit to the approach and not manually engineered. A feature similarity score may be determined based on the percentage of matching visual features between the reference image and the comparison image. In some examples, a deep neural network or other computer vision or machine learning approaches may be used to determine the feature similarity score.

As shown in the example of FIGS. 6A and 6B, visual features such as storefront sign 412 and door 414 in image region 610 are compared with storefront sign 422 and door 424 in image region 620. The feature similarity score of image regions 610 and 620 is increased by the fact that the locations of storefront sign 412 and door 414 match the locations of storefront sign 422 and door 424. On the other hand, the feature similarity score is decreased by the fact that the direction of the stripes on door 414 (diagonal up from left to right) does not match the direction of the stripes on door 424 (horizontal). The feature similarity score therefore may be determined to be about 60%.

Using the text similarity score and the feature similarity score, a confidence level for whether the selected business in the reference image is the same as any business in the comparison image may be determined. For example, a text similarity score and a feature similarity score may be combined using a simple or weighted sum, average, or other method to determine a confidence level. Using reference image 400A and comparison image 400B, the confidence level for the "RESTAURANT UNO" business may be determined as the average of the text similarity score (20%) and the features similarity score (60%). The determined confidence level for "RESTAURANT UNO" still being in business may therefore be 40%. The confidence level may be highest when both the text similarity score and the image similarity score are relatively high, meaning the selected business shown in the reference image and a business shown in the comparison image is the same. On the other hand, the confidence level may be lowest when both the text similarity score and the image similarity score are relatively low, meaning the business shown in the reference image is not shown in the comparison image.

According to the confidence level, business information of the business may be updated. The higher the confidence level, the more likely the selected business still exists at the business location. Thus, if the confidence level is above a confidence level threshold, such as 50%, the business information for the business may be updated to include a confirmation that the business is still open at the time indicated on the timestamp of the comparison image. In addition, the comparison image may be stored in association with the business. In some examples, the comparison image may be used as the reference image in future comparisons. The lower the confidence level, the more likely the selected business is closed at the business location. In this example, if the confidence level is below the threshold confidence level, the business information for the business may be updated to indicate the selected business is closed or replaced by a new business. Because the confidence level for "RESTAURANT UNO" is 40%, which is less than the confidence level threshold of 50%, business information for "RESTAURANT UNO" is updated to indicate that it is no longer open at business location 330. Business information for the new business, such as name, telephone number, etc., may be extracted and stored in association with the business location. Because "RESTAURANT 2" is now depicted at business location 330 in new image 400B, business information for "RESTAURANT 2" is updated with at least the address for business location 330 and indicated as open.

The updated business information may be provided in response to request for business information of the business. A request for business information of a business may be received from a client computing device. In response to the request, the relevant business information may be transmitted to the client computing device for display. The relevant business information may include confirmation that the business is still open, indication that the business is closed, business information of a business that replaced the business at the business location, and/or one or more images of the business.

In some examples, multiple threshold confidence levels may be used to update business information using the confidence level. For example, if the confidence level is above a first threshold confidence level, such as 75%, the business information may be updated to confirm that the business is still open and store the comparison image in association with the selected business. If the confidence level is below a second threshold confidence level that is lower than the first threshold confidence level, such as 25%, the business information may be updated to indicate that the selected business is closed. If the confidence level is above the second threshold confidence (25%), but below the first threshold confidence level (75%), the reference image and/or the comparison image may be flagged or otherwise sent to a human operator for review. A decision may then be received from the human operator as to whether the business shown in the reference image is shown in the comparison image. The decision may be used to update the business information for the selected business as well as to inform future comparisons.

Alternatively, a first confidence level and a second confidence level may be determined and used to update business information. The first confidence level may indicate a confidence or likelihood that the selected business in the reference image is the same as a detected business in the comparison image. The second confidence level may indicate a confidence or likelihood that the selected business is different from the detected business. If the first confidence level exceeds a first threshold confidence level, the business information for the business may be updated to confirm the business is still open. If the second confidence level exceeds a second threshold confidence level, the business information for the business may be updated to indicate that the selected business is closed. If both confidence levels exceed their respective threshold confidence levels, the reference image and/or the comparison image may be flagged or otherwise sent to a human operator for review. If both confidence levels fall below their respective threshold confidence levels, the reference image and/or the comparison image may also be flagged or sent to a human operator for review.

Other updates to the business information based on the comparison image may be made as well. For example, an indication may be included in the business information that the business was renovated or rebranded if words such as "grand reopening" or features such as a new logo are detected in the comparison image. Also, if a different phone number is detected in the comparison image, the business information may be updated to reflect the new phone number.

Further examples may include selecting and comparing a plurality of comparison images with the reference image. An overall confidence level may be may be determined from text and feature similarity scores determined from every comparison.

In other examples, comparing the reference image and the comparison image may include checking for objects that may be occluding the business location of the reference image and/or the comparison image. An example of an object that may occlude the business location is a truck parked in front of the storefront. If an occluding object is detected, the features of the occluding object may be omitted in performing the comparison. Alternatively, another reference image and/or another comparison image may be selected for use in the comparison.

In the case of an exhaustive sweep update of selected businesses along a route, a series of new images of the selected business may be received from one or more runs along the route by a vehicle or other device configured to collect images sequentially along a route. Then, each business of the selected businesses may be updated as described above.

FIG. 7 is an example flow diagram 700 in accordance with some of the aspects described above that may be performed at the one or more processors 112. However, the features described may be implemented by any of a variety of systems having different configurations. In addition, the operations involved in the methods need not be performed in the precise order described. Rather, various operations may be handled in a different order or simultaneously, and operations may be added or omitted.

At block 702, a business associated with stored business information may be selected. At block 704, a reference image depicting a business location of the business may be selected from pre-stored images. The reference image may a timestamp indicating a date and a time when the reference image was taken.

One or more new images may be identified based on characteristics of at least one of the business and the reference image at block 706. Each of the one or more new images may be taken more recently than the reference image. In other words, the one or new images may be associated with timestamps that are more recent than the timestamp of the reference image. The one or more new images may also be associated with location and orientation information describing the location and the angle from which each image was taken. At block 708, for each new image, a likelihood value is determined that is indicative of the likelihood that the business location is shown in a given new image of the one or more new images. The likelihood value may be based on a physical relationship between the given new image's location and orientation and one or more rays projected from the business location and the location of the given new image. From the one or more new images, a comparison image may then be selected at block 710. The comparison image may be selected based on the likelihood values of the one or more new images.

At block 712, text information and visual features of the reference image may be compared with text information and visual features of the comparison image. A text similarity score and a feature similarity score may be determined based on the comparison at block 714. Using the text similarity score and the feature similarity score, a confidence level may be determined. The confidence level may indicate whether the business in the reference image is in the comparison image. At block 716, the business information of the business may be updated according to the confidence level. The update may include providing an indication that a business is closed if the confidence level indicates that the business in the comparison image is not the same as the business in the reference image. Or, if the business in the comparison image is the same as the business in the reference image, the update may include providing confirmation that a business is still open.

The features described above may be used to automatically or semi-automatically update business information using two images of a business location. Specifically, the automatic or semi-automatic features allow for updates to occur more frequently and much faster than manually updating business information. As a result, the features create and manage a large, up-to-date database of business information that may be provided to users. The database allows users to easily find relevant information for a particular business; therefore saving the user the frustration of traveling to a business location only to find that the business that they were looking for is no longer open.

Although the invention herein has been described with reference to particular embodiments, it is to be understood that these embodiments are merely illustrative of the principles and applications of the present invention. Most of the foregoing illustrative embodiments are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   selecting, using one or more processors, a business associated with stored business information;
   selecting, from pre-stored images, using the one or more processors, a reference image depicting a business location of the business, the reference image having a timestamp;
   identifying, using the one or more processors, one or more new images based on characteristics of at least one of the business and the reference image, each of the one or more new images being associated with a timestamp that is more recent than the timestamp of the reference image and location and orientation information;
   for each new image, determining, using the one or more processors, a likelihood value indicative of the likelihood that the business location is shown in a given new image of the one or more new images by:
      projecting one or more rays from the business location to the a location of the given new image, and
      identifying an angular relationship between the one or more rays and the given new image's location and orientation;
   selecting from the one or more new images, using the one or more processors, a comparison image based on the likelihood values of the one or more new images;
   comparing, using the one or more processors, text information and visual features of the reference image with text information and visual features of the comparison image;
   determining, using the one or more processors, a text similarity score and a feature similarity score based on the comparison;
   determining, using the one or more processors, a confidence level using the text similarity score and the feature similarity score, the confidence level indicating whether the business in the reference image is in the comparison image; and
   updating, using the one or more processors, the business information of the business according to the confidence level.

2. The method of claim 1, further comprising:
receiving, using the one or more processors, a request for business information of the business; and
providing, using the one or more processors, the updated business information in response to the request.

3. The method of claim 1, wherein a likelihood value for a particular image is highest when the particular image is oriented along one of the rays and in the direction of the business location.

4. The method of claim 1, wherein selecting the comparison image further comprises:
determining whether the likelihood value of each new image of the one or more new images satisfies a likelihood value threshold; and
selecting a new image that both satisfies the likelihood value threshold and has a most recent timestamp of any other new images of the one or more new images that also satisfy the likelihood value as the comparison image.

5. The method of claim 1, further comprising:
identifying, by the one or more processors, an image region in the reference image and an image region in the comparison image, and
wherein comparing the text information and visual features of the reference image with text information and visual features of the comparison image comprises comparing text information and visual features from within the image regions.

6. The method of claim 1, wherein comparing the text information of the reference image with text information of the comparison image further comprises:
detecting words in the reference image and the comparison image; and
determining a percentage of the words detected in the comparison image that match the words detected in the reference image, wherein the text similarity score is determined further based on the percentage.

7. The method of claim 6, further comprising determining a number of uncommon words detected in the comparison image that match the words detected in the reference image, and wherein the text similarity score is based on at least the determined number of uncommon words.

8. The method of claim 1, wherein the feature similarity score is determined based on at least a percentage of visual features in the comparison image that match visual features in the reference image.

9. The method of claim 1, wherein updating the business information comprises, when the confidence level is above a confidence level threshold, storing the comparison image in association with the business.

10. The method of claim 9, wherein the confidence level threshold is a first confidence level threshold and updating the business information comprises, when the confidence level is below the first confidence level threshold and above a second confidence level threshold, flagging the comparison image for review.

11. The method of claim 1, wherein updating the business information comprises, when the confidence level is below a confidence level threshold, indicating the business is closed or replaced by another business.

12. The method of claim 1, wherein selecting the reference image further comprises checking for objects in one or more of the pre-stored images that are at least partially occluding the business location.

13. The method of claim 1, further comprising:
selecting, by the one or more processors, a plurality of businesses along a route; and
receiving, by the one or more processors, a series of new images from a device configured to collect images sequentially along the route;
wherein each business in the plurality of businesses is selected and updated sequentially along the route.

14. A system comprising:
a memory storing business information and one or more images in association with one or more businesses; and
one or more processors configured to:
select a business associated with stored business information;
select a reference image depicting a business location of the business, the reference image having a timestamp;
identify one or more new images based on characteristics of at least one of the business and the reference image, each of the one or more new images being associated with a timestamp that is more recent than the timestamp of the reference image and location and orientation information;
for each new image, determine a likelihood value indicative of the likelihood that the business location is shown in a given new image of the one or more new images by:
projecting one or more rays from the business location to the a location of the given new image, and
identifying an angular relationship between the one or more rays and the given new image's location and orientation;
select from the one or more new images a comparison image based on the likelihood values of the one or more new images;
compare text information and visual features of the reference image with text information and visual features of the comparison image;
determine a text similarity score and a feature similarity score based on the comparison;
determine a confidence level using the text similarity score and the feature similarity score, the confidence level indicating whether the business in the reference image is in the comparison image; and
update the business information of the business according to the confidence level.

15. The system of claim 14, wherein the one or more processors are further configured to:
receive a request for business information of the business; and
provide the updated business information in response to the request.

16. The system of claim 14, wherein the one or more processors are further configured to select the comparison image by:
determining whether the likelihood value of each new image of the one or more new images satisfies a likelihood value threshold; and
selecting a new image that both satisfies the likelihood value threshold and has a most recent timestamp of any other new images of the one or more new images that also satisfy the likelihood value as the comparison image.

17. The system of claim 14, wherein the one or more processors are further configured to:
identify an image region in the reference image and an image region in the comparison image, and
wherein the text information and visual features of the reference image are compared with text information and visual features of the comparison image by comparing text information and visual features from within the image regions.

18. The system of claim 14, wherein the one or more processors are further configured to compare the text information of the reference image with text information of the comparison image by:
   detecting words in the reference image and the comparison image;
   determining a percentage of the words detected in the comparison image that match the words detected in the reference image, wherein the text similarity score is determined further based on the percentage; and
   determining a number of uncommon words detected in the comparison image that match the words detected in the reference image.

19. The system of claim 14, wherein the one or more processors are further configured to select the reference image by checking for objects in one or more of the pre-stored images that are at least partially occluding the business location.

20. A non-transitory, tangible machine readable medium on which instructions are stored, the instructions, when executed by one or more processors, cause the one or more processors to perform a method, the method comprising:
   selecting a business associated with stored business information;
   selecting a reference image depicting a business location of the business, the reference image having a timestamp;
   identifying one or more new images based on characteristics of at least one of the business and the reference image, each of the one or more new images being associated with a timestamp that is more recent than the timestamp of the reference image and location and orientation information;
   for each new image, determining a likelihood value indicative of the likelihood that the business location is shown in a given new image of the one or more new images by:
      projecting one or more rays from the business location to the a location of the given new image, and
      identifying an angular relationship between the one or more rays and the given new image's location and orientation;
   selecting from the one or more new images a comparison image based on the likelihood values of the one or more new images;
   comparing text information and visual features of the reference image with text information and visual features of the comparison image;
   determining a text similarity score and a feature similarity score based on the comparison;
   determining a confidence level using the text similarity score and the feature similarity score, the confidence level indicating whether the business in the reference image is in the comparison image; and
   updating the business information of the business according to the confidence level.

* * * * *